US012001107B2

(12) United States Patent
Nakamura

(10) Patent No.: US 12,001,107 B2
(45) Date of Patent: Jun. 4, 2024

(54) DISPLAY DEVICE

(71) Applicant: Japan Display Inc., Tokyo (JP)

(72) Inventor: Tenfu Nakamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/113,876

(22) Filed: Feb. 24, 2023

(65) Prior Publication Data

US 2023/0213828 A1 Jul. 6, 2023

Related U.S. Application Data

(63) Continuation of application No. 17/741,579, filed on May 11, 2022, now Pat. No. 11,614,668.

(30) Foreign Application Priority Data

May 11, 2021 (JP) .................................. 2021-080435

(51) Int. Cl.
*G02F 1/1347* (2006.01)
*G02F 1/1334* (2006.01)
*G02F 1/1362* (2006.01)
*G02F 1/1368* (2006.01)

(52) U.S. Cl.
CPC ...... *G02F 1/136286* (2013.01); *G02F 1/1334* (2013.01); *G02F 1/13471* (2013.01); *G02F 1/1368* (2013.01)

(58) Field of Classification Search
CPC ..................................................... G02F 1/1362
See application file for complete search history.

(56) References Cited

U.S. PATENT DOCUMENTS

| 2011/0116013 | A1 | 5/2011 | Sano et al. |
| 2019/0302496 | A1 | 10/2019 | Okuyama |
| 2021/0132279 | A1* | 5/2021 | Numata ................. G02F 1/1334 |
| 2022/0179269 | A1* | 6/2022 | Ikeda ......................... G09F 9/00 |

FOREIGN PATENT DOCUMENTS

| JP | 2011-107299 A | 6/2011 |
| JP | 2019-174531 A | 10/2019 |

* cited by examiner

*Primary Examiner* — Sang V Nguyen
(74) *Attorney, Agent, or Firm* — K&L Gates LLP

(57) ABSTRACT

According to one embodiment, a display device including a first transparent substrate, a second transparent substrate, a liquid crystal layer, a third transparent substrate, and a transparent layer having a refractive index lower than a refractive index of the third transparent substrate, wherein the transparent layer includes a plurality of band portions including first to third band portions, a second end portion has a smaller width than a first end portion in band portions, the second end portion of the second band portion has a smaller width than the second end portion of the first band portion, and the second end portion of the third band portion has a smaller width than the second end portion of the first band portion.

20 Claims, 10 Drawing Sheets

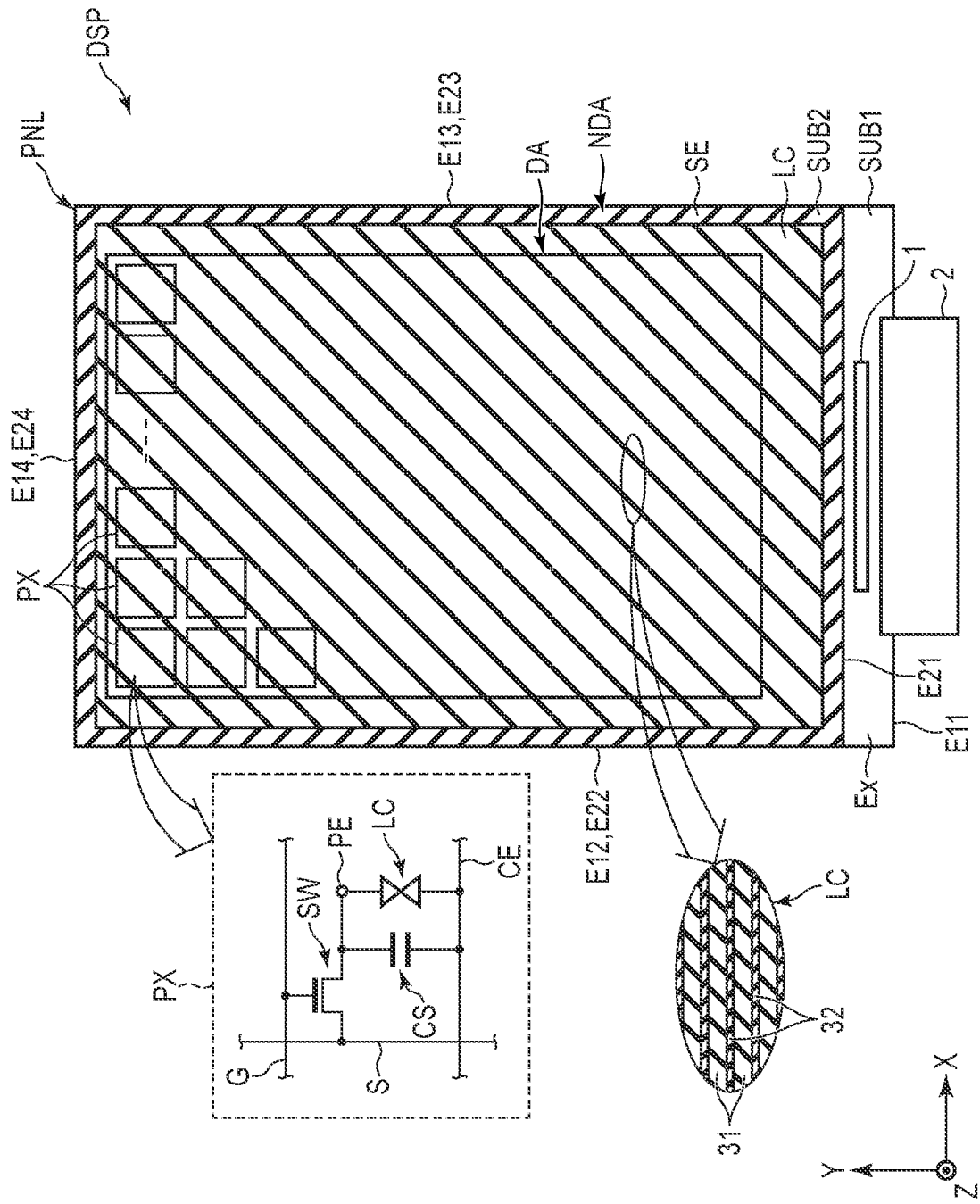
F I G. 1

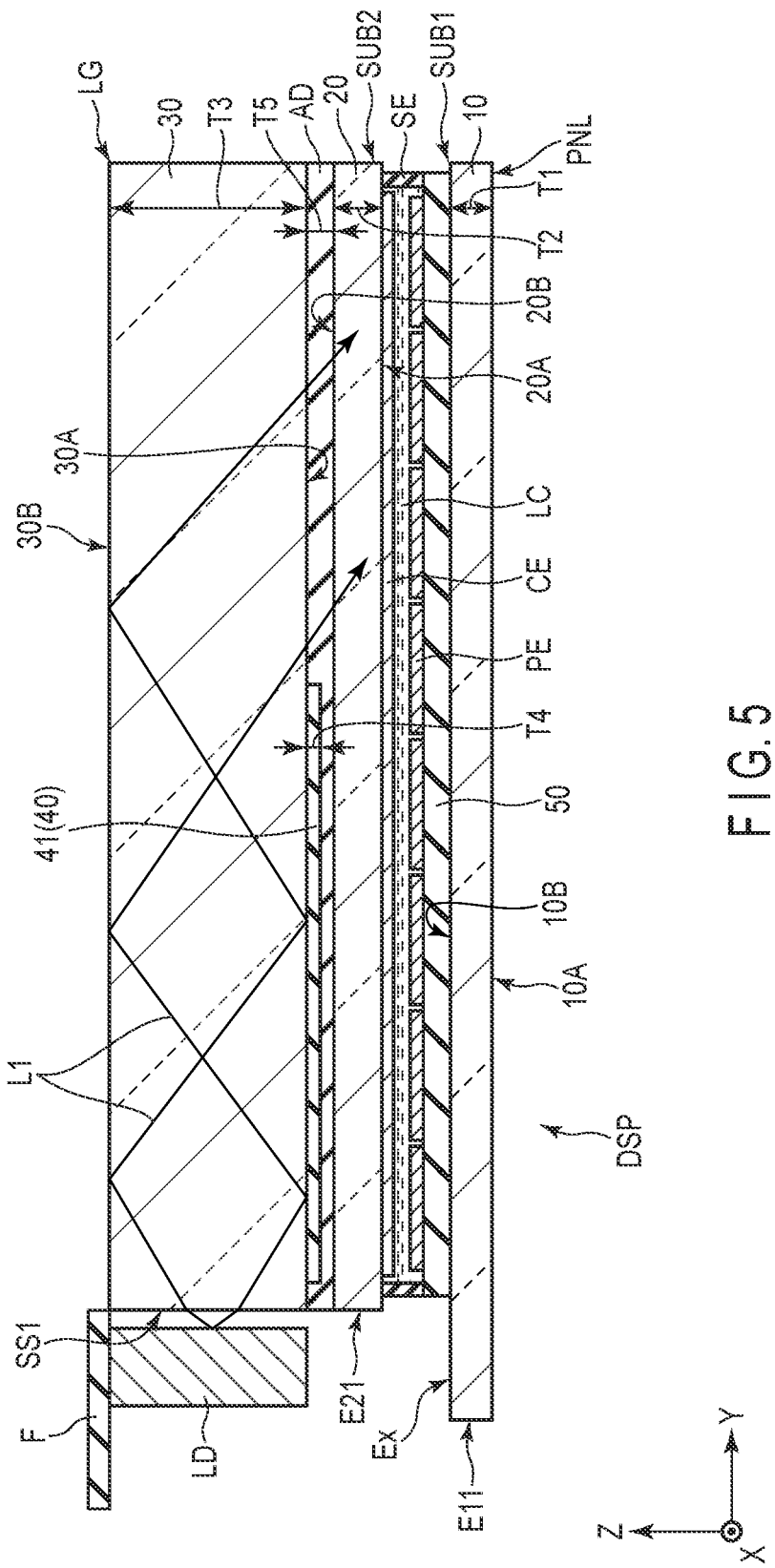
F I G. 5

DISPLAY DEVICE

CROSS-REFERENCE TO RELATED APPLICATIONS

This application is a continuation of U.S. patent application Ser. No. 17/741,579, filed on May 11, 2022, which application is based upon and claims the benefit of priority from Japanese Patent Application No. 2021-080435, filed May 11, 2021, the entire contents of all of which are incorporated herein by reference.

FIELD

Embodiments described herein relate generally to a display device.

BACKGROUND

A display device capable of switching between a scattered state in which incident light is scattered and a transmissive state in which incident light is transmitted using a polymer dispersed liquid crystal (PDLC) has been proposed. This is intended to prevent reflection and the like, and is a technique of partially applying a voltage to the PDLC to switch between transmission and scattering. In a transparent display device using a PDLC, an edge light system in which a light source is disposed at an end portion of a light guide plate is adopted. However, when the edge light system is used in the PDLC display device, there is a problem that the luminance of the display surface decreases as the distance from the light source increases. In addition, since the amount of light reaching from the light source decreases as it is closer to the left and right sides of the display surface, there is a problem that a luminance difference occurs between the center and the left and right of the display surface.

BRIEF DESCRIPTION OF THE DRAWINGS

FIG. 1 is a plan view showing a configuration example of a display device according to the embodiment.

FIG. 5 is a schematic cross-sectional view of the display device shown in FIG. 3 along a second direction.

DETAILED DESCRIPTION

Figure 2:
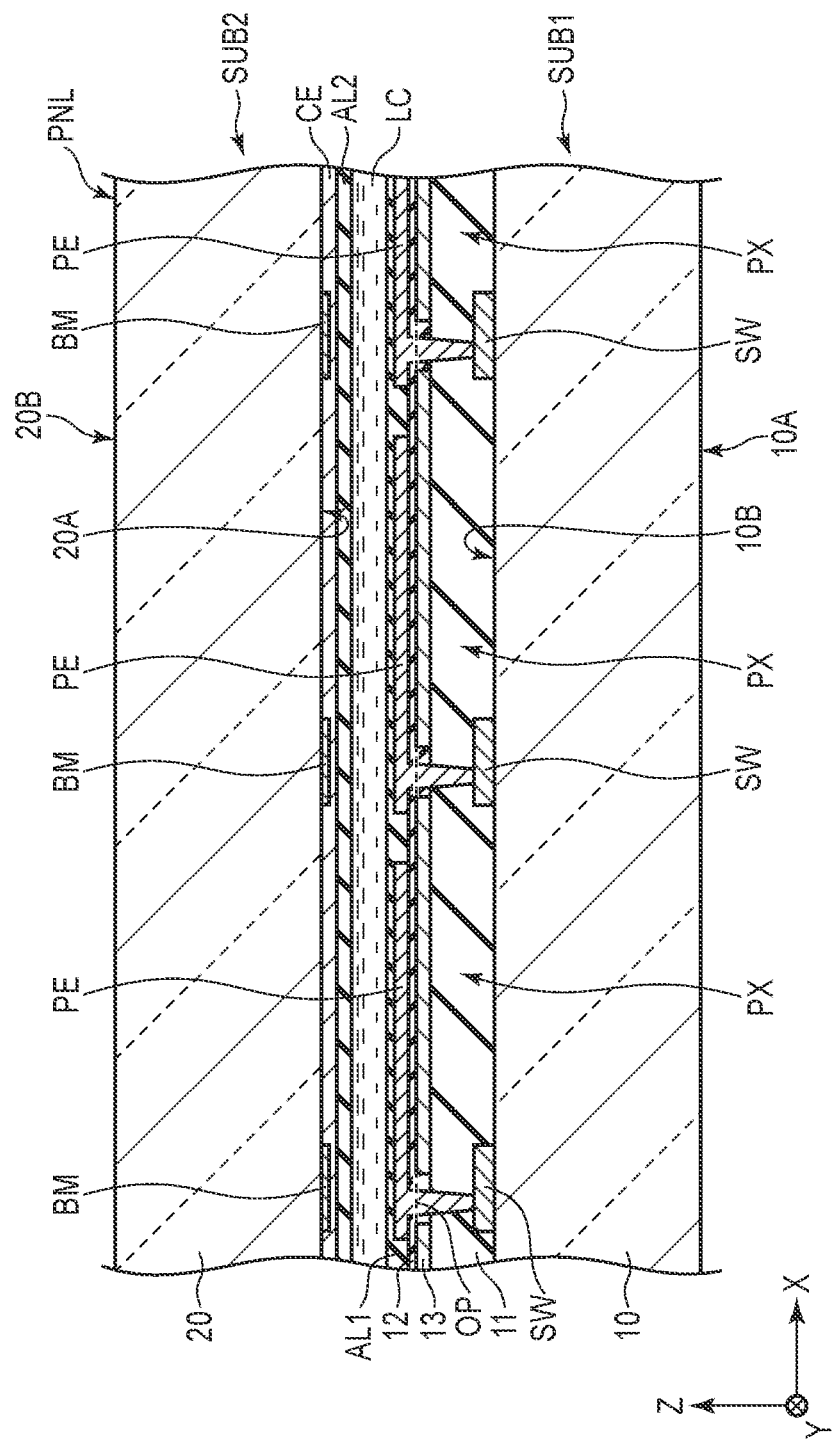
FIG. 2 is a cross-sectional view showing a configuration example of a display panel shown in FIG. 1.

In general, according to one embodiment, a display device comprising a first substrate comprising a first transparent substrate, a scanning line, a signal line intersecting with the scanning line, a switching element electrically connected to the scanning line and the signal line, and a pixel electrode electrically connected to the switching element, a second substrate comprising a second transparent substrate and a common electrode opposed to the pixel electrode, a liquid crystal layer held between the first substrate and the second substrate and including streaky polymers and liquid crystal molecules, a plurality of light emitting elements arranged in a first direction, a third transparent substrate comprising a main surface, a first side surface opposed to the light emitting elements, a second side surface intersecting with the first side surface, and a third side surface intersecting with the first side surface and opposed to the second side surface, and a transparent layer disposed on the main surface and having a refractive index lower than a refractive index of the third transparent substrate, wherein the third transparent substrate is bonded to the first transparent substrate or the second transparent substrate with the transparent layer interposed therebetween, the transparent layer comprises a plurality of band portions arranged in the first direction and extending in a second direction intersecting with the first direction, the band portion comprises a first end portion on the light emitting element side, and a second end portion opposite to the first end portion, the second end portion has a smaller width than the first end portion, the band portion includes a first band portion, a second band portion located between the first band portion and the second side surface, and a third band portion located between the first band portion and the third side surface, the second end portion of the second band portion has a smaller width than the second end portion of the first band portion, and the second end portion of the third band portion has a smaller width than the second end portion of the first band portion.

According to another embodiment, a display device comprising a first substrate comprising a first transparent substrate, a scanning line, a signal line intersecting with the scanning line, a switching element electrically connected to the scanning line and the signal line, and a pixel electrode electrically connected to the switching element, a second substrate comprising a second transparent substrate and a common electrode opposed to the pixel electrode, a liquid crystal layer held between the first substrate and the second substrate and including streaky polymers and liquid crystal molecules, a plurality of light emitting elements arranged in a first direction, a third transparent substrate comprising a main surface, a first side surface opposed to the light emitting elements, a second side surface intersecting with the first side surface, and a third side surface intersecting with the first side surface and opposed to the second side surface, and a transparent layer disposed on the main surface and having a refractive index lower than a refractive index of the third transparent substrate, wherein the transparent layer is located between the liquid crystal layer and the third transparent substrate, the transparent layer comprises a plurality of band portions arranged in the first direction and extending in a second direction intersecting with the first direction, the band portion comprises a first end portion on the light emitting element side, a second end portion opposite to the first end portion, and an intermediate portion between the first end portion and the second end portion, the first end portion has a larger width than the intermediate portion, the second end portion has a larger width than the intermediate portion, the band portion includes a first band portion, a second band portion located between the first band portion and the second side surface, and a third band portion located between the first band portion and the third side surface, the intermediate portion of the second band portion has a smaller width than the intermediate portion of the first band portion, and the intermediate portion of the third band portion has a smaller width than the intermediate portion of the first band portion.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a plan view schematically showing a configuration of a display device DSP according to the embodiment.

For example, a first direction X, a second direction Y and a third direction Z are orthogonal to each other, but they may intersect at an angle other than 90 degrees. The first direction X and the second direction Y correspond to the directions parallel to a main surface of a substrate that constitutes the display device DSP. The third direction Z is equivalent to a thickness direction of the display device DSP. In the following descriptions, a direction from a first substrate SUB1 towards a second substrate SUB2 is referred to as "upward" (or simply, above) and a direction from the second substrate SUB2 towards the first substrate SUB1 is referred to as "downward" (or simply, below). With such expressions "a second member above a first member" and "a second member below a first member", the second member may be in contact with the first member or may be remote from the first member. Further, it is assumed that there is an observation position to observe the display device DSP on a tip side of an arrow in a third direction Z, and viewing from this observation position toward the X-Y plane defined by the first direction X and the second direction Y is referred to as a planar view.

In the present embodiment, a liquid crystal display device to which a polymer dispersed liquid crystal is applied will be described as an example of a display device DSP. The display device DSP includes a display panel PNL, an IC chip 1, and a wiring board 2.

The display panel PNL includes a first substrate SUB1, a second substrate SUB2, a liquid crystal layer LC, and a sealant SE. The first substrate SUB1 and the second substrate SUB2 are formed in a flat plate shape parallel to the X-Y plane. The first substrate SUB1 and the second substrate SUB2 overlap each other in planar view. The first substrate SUB1 and the second substrate SUB2 are bonded together by the sealant SE. The liquid crystal layer LC is held between the first substrate SUB1 and the second substrate SUB2, and is sealed by the sealant SE. In FIG. 1, the liquid crystal layer LC and the sealant SE are indicated by different hatch lines.

As shown schematically in an enlarged manner in FIG. 1, the liquid crystal layer LC includes a polymer dispersed liquid crystal containing polymers 31 and liquid crystal molecules 32. For example, the polymers 31 are liquid crystal polymers. The polymers 31 are formed in a streak shape extending along the first direction X. The liquid crystal molecules 32 are dispersed in gaps between the polymers 31, and are aligned such that their major axes are along the first direction X. Each of the polymers 31 and the liquid crystal molecules 32 has optical anisotropy or refractive anisotropy. The responsiveness of the polymers 31 to an electric field is lower than the responsiveness of the liquid crystal molecules 32 to the electric field.

For example, the alignment direction of the polymers 31 hardly changes regardless of the presence or absence of the electric field. In contrast, the alignment direction of the liquid crystal molecules 32 changes according to the electric field in a state where a high voltage equal to or higher than a threshold value is applied to the liquid crystal layer LC. In a state where no voltage is applied to the liquid crystal layer LC, the optical axes of the polymers 31 and the liquid crystal molecules 32 are parallel to each other, and the light incident on the liquid crystal layer LC is transmitted almost without being scattered in the liquid crystal layer LC (transparent state). In a state where a voltage is applied to the liquid crystal layer LC, the optical axes of the polymers 31 and the liquid crystal molecules 32 intersect with each other, and the light incident on the liquid crystal layer LC is scattered in the liquid crystal layer LC (scattered state).

The display panel PNL includes a display portion DA configured to display an image and a frame-shaped non-display portion NDA that surrounds the display portion DA. The sealant SE is located in the non-display portion NDA. The display portion DA includes pixels PX arrayed in a matrix in the first direction X and the second direction Y.

As shown in an enlarged manner in FIG. 1, each pixel PX includes a switching element SW, a pixel electrode PE, a common electrode CE, a liquid crystal layer LC, and the like. The switching element SW is constructed from, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The signal line S intersects with the scanning line G. The pixel electrode PE is electrically connected to the switching element SW. Each of the pixel electrodes PEs is opposed to the common electrode CE, and the liquid crystal layer LC (in particular, liquid crystal molecules 32) is driven by an electric field generated between the pixel electrode PE and the common electrode CE. The scanning line G, the signal line S, the switching element SW, and the pixel electrode PE are provided in the first substrate SUB1. A capacitance CS is formed, for example, between an electrode having the same electric potential as the common electrode CE and an electrode having the same electric potential as the pixel electrode PE.

The first substrate SUB1 has edge portions E11 and E14 extending along the first direction X and edge portions E12 and E13 extending along the second direction Y. The second substrate SUB2 has edge portions E21 and E24 extending along the first direction X and edge portions E22 and E23 extending along the second direction Y. In the example shown in FIG. 1, the edge portions E12 and E22, the edge portions E13 and E23, and the edge portions E14 and E24 overlap each other in planar view, but may not overlap each other. The edge portion E21 is located between the edge portion E11 and the display portion DA in planar view. The first substrate SUB1 has an extended portion Ex between the edge portion E11 and the edge portion E21.

Each of the IC chip 1 and the wiring board 2 is connected to the extended portion Ex. The IC chip 1 incorporates, for example, a display driver that outputs a signal necessary for image display. The wiring board 2 is, for example, a bendable flexible printed circuit board. Incidentally, the IC chip 1 may be connected to the wiring board 2. The IC chip 1 and the wiring board 2 may read a signal from the display panel PNL, but primarily function as a signal source that supplies a signal to the display panel PNL.

FIG. 2 is a cross-sectional view showing a configuration example of the display panel PNL shown in FIG. 1.

The first substrate SUB1 includes a transparent substrate (first transparent substrate) 10, insulating films 11 and 12, a capacitive electrode 13, the switching element SW, the pixel electrode PE, and an alignment film AL1. The first substrate SUB1 further includes the scanning lines G and the signal lines S shown in FIG. 1.

The transparent substrate 10 includes a main surface (lower surface) 10A and a main surface (upper surface) 10B opposite to the main surface 10A. The switching element SW is disposed on the main surface 10B. The insulating film 11 covers the switching element SW. The capacitive electrode 13 is located between the insulating films 11 and 12. The pixel electrode PE is disposed on the insulating film 12 for each pixel PX. The pixel electrode PE is electrically connected to the switching element SW via an opening portion OP of the capacitive electrode 13. The pixel electrode PE overlaps the capacitive electrode 13 with the insulating film 12 interposed therebetween to form the capacitance CS of the pixel PX. The alignment film AL1 covers the pixel electrode PE.

The second substrate SUB2 includes a transparent substrate (second transparent substrate) 20, a light-shielding layer BM, the common electrode CE, and an alignment film AL2.

The transparent substrate 20 includes a main surface (lower surface) 20A and a main surface (upper surface) 20B opposite to the main surface 20A. The main surface 20A of the transparent substrate 20 faces the main surface 10B of the transparent substrate 10. The light-shielding layer BM and the common electrode CE are disposed on the main surface 20A. The light-shielding layer BM is located, for example, directly above the switching element SW and directly above the scanning line G and the signal line S (not shown). The common electrode CE is disposed over a plurality of pixels PX and directly covers the light-shielding layer BM. The common electrode CE is opposed to the pixel electrode PE. The common electrode CE is electrically connected to the capacitive electrode 13, and has the same electric potential as the capacitive electrode 13. The alignment film AL2 covers the common electrode CE. The liquid crystal layer LC is located between the main surface 10B and the main surface 20A and is in contact with the alignment films AL1 and AL2.

The transparent substrates 10 and 20 are insulating substrates such as glass substrates or flexible resin substrates. The main surfaces 10A and 10B and the main surfaces 20A and 20B are planes substantially parallel to the X-Y plane. The insulating film 11 is formed of a transparent insulating material such as silicon oxide, silicon nitride, silicon oxynitride, and acrylic resin. For example, the insulating film 11 includes an inorganic insulating film and an organic insulating film. The insulating film 12 is an inorganic insulating film such as silicon nitride. The capacitive electrode 13, the pixel electrode PE, and the common electrode CE are transparent electrodes formed of a transparent conductive material such as indium tin oxide (ITO) or indium zinc oxide (IZO). The light-shielding layer BM is, for example, a conductive layer having a lower resistance than the common electrode CE. For example, the light-shielding layer BM is formed of an untransparent metal material such as molybdenum, aluminum, tungsten, titanium, or silver. The alignment films AL1 and AL2 are horizontal alignment films having an alignment restriction force approximately parallel to the X-Y plane. For example, the alignment films AL1 and AL2 are subjected to alignment treatment along the first direction X. Incidentally, the alignment treatment may be rubbing treatment or optical alignment treatment.

Figure 3:
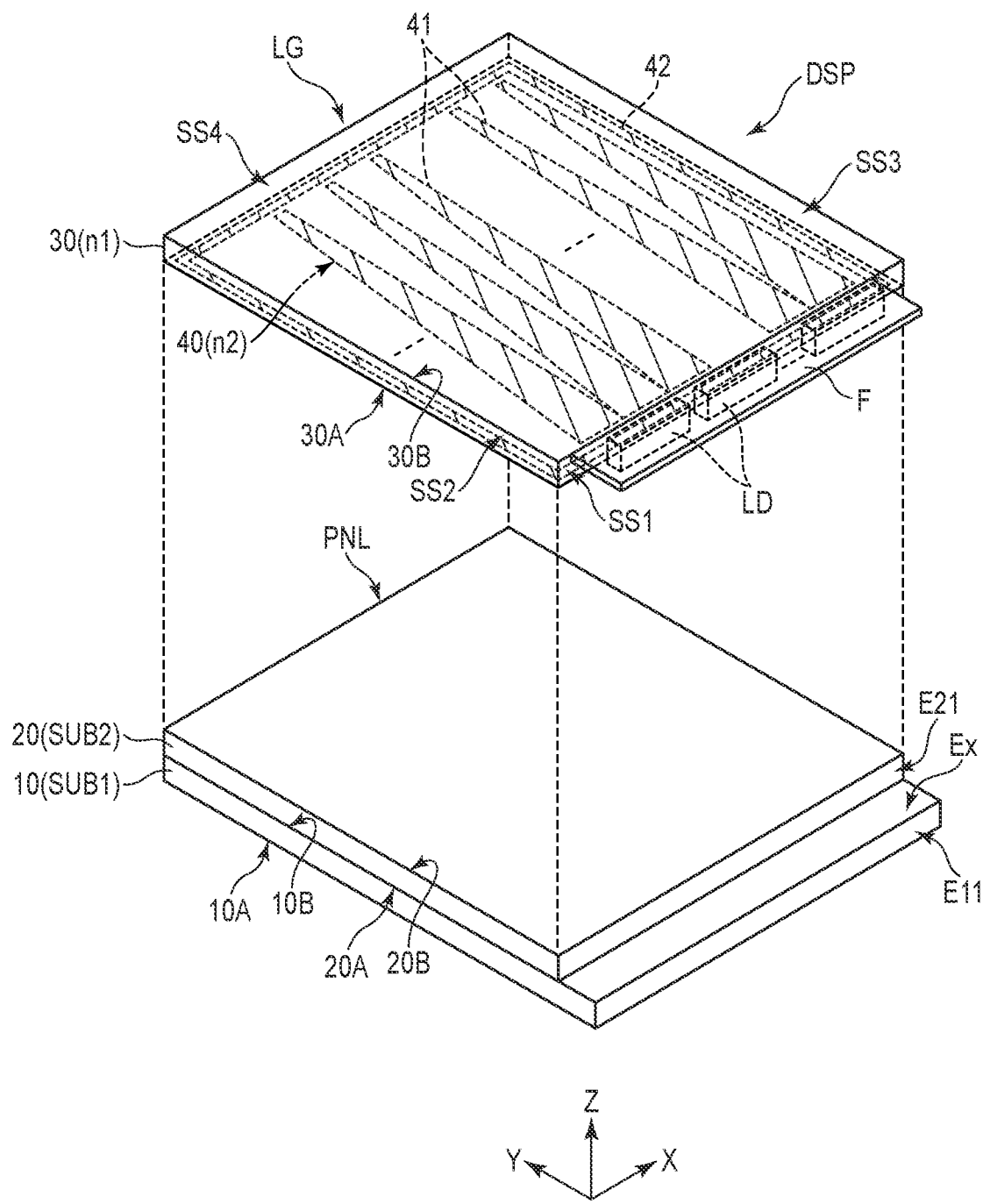
FIG. 3 is an exploded perspective view showing a main part of the display device shown in FIG. 1.

FIG. 3 is an exploded perspective view showing a main part of the display device DSP shown in FIG. 1.

The display device DSP includes a plurality of light emitting elements LD and a light guide element LG in addition to the display panel PNL. The first substrate SUB1, the second substrate SUB2, and the light guide element LG are arranged in this order along the third direction Z.

The plurality of light emitting elements LD is arranged spaced apart in the first direction X. The plurality of light emitting elements LD is connected to a wiring board F. The light emitting element LD is, for example, a light-emitting diode. The light emitting element LD includes a red light emitting portion, a green light emitting portion, and a blue light emitting portion though not described in detail. The light emitted from the light emitting element LD travels along an arrow direction indicating the second direction Y.

The light guide element LG includes a transparent substrate (third transparent substrate) 30 and a transparent layer 40.

The transparent substrate 30 is an insulating substrate such as a glass substrate or a plastic substrate, and has a refractive index n1. For example, the transparent substrate 30 is not formed by laminating a plurality of substrates, but is a single substrate. The transparent substrate 30 includes a main surface (lower surface) 30A, a main surface (upper surface) 30B opposite to the main surface 30A, a first side surface SS1, a second side surface SS2, a third side surface SS3, and a fourth side surface SS4. The main surfaces 30A and 30B are planes substantially parallel to the X-Y plane. The main surface 30A is opposed to the main surface 20B of the transparent substrate 20. The first side surface SS1 is opposed to the plurality of light emitting elements LD. The first side surface SS1 and the fourth side surface SS4 extend in the first direction X. The second side surface SS2 and the third side surface SS3 extend in the second direction Y. The first side surface SS1 and the fourth side surface SS4 are opposed to each other. The second side surface SS2 and the third side surface SS3 are opposed to each other. The second side surface SS2 and the third side surface SS3 intersect with the first side surface SS1. The transparent substrate 30 is bonded to the transparent substrate 20 with the transparent layer 40 interposed therebetween as described later. Incidentally, in the example shown in FIG. 3, the first side surface SS1 is located directly above the edge portion E21 of the second substrate SUB2. However, the first side surface SS1 may be located directly above the extended portion Ex, or may be located further outside the edge portion E11.

The transparent layer 40 is disposed on the main surface 30A. The transparent layer 40 has a refractive index n2 lower than a refractive index n1 of the transparent substrate 30. The transparent layer 40 includes a plurality of band portions 41 arranged spaced apart in the first direction X. Each of the band portions 41 extends along the second direction Y. The main surface 30A is exposed between the band portions 41 adjacent to each other. In addition, the transparent layer 40 includes a frame portion 42 surrounding the plurality of band portions 41. Incidentally, a detailed shape of the transparent layer 40 will be described later.

The transparent substrate 30 is formed of, for example, an organic material such as glass, polymethyl methacrylate (PMMA), or polycarbonate (PC). The transparent layer 40 is formed of, for example, an organic material such as a siloxane-based resin or a fluorine-based resin. In addition, the refractive index n1 of the transparent substrate 30 is about 1.5, and the refractive index n2 of the transparent layer 40 is about from 1.0 to 1.4.

Figure 4:
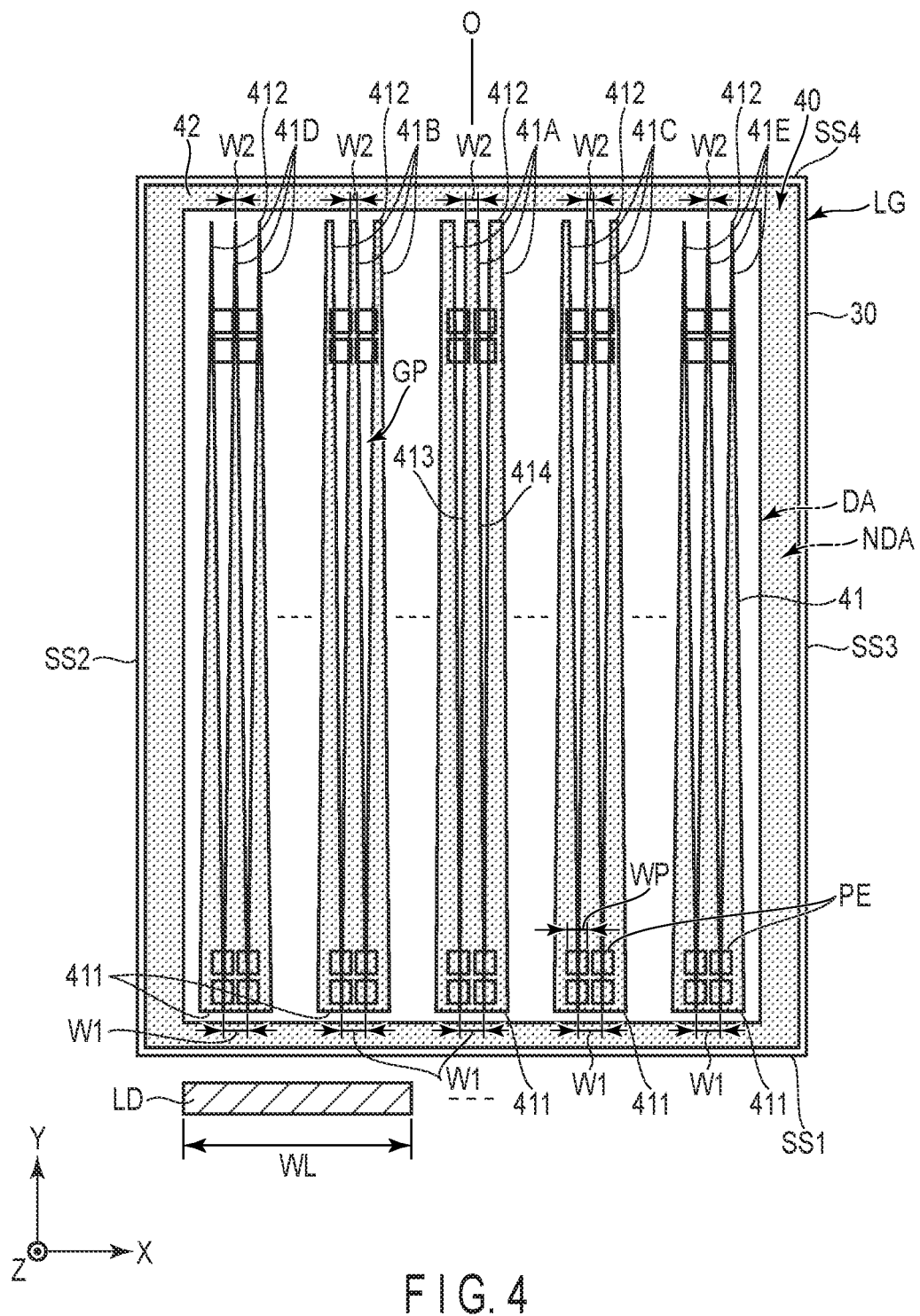
FIG. 4 is a plan view showing a configuration example of a light guide element shown in FIG. 3.

FIG. 4 is a plan view showing a configuration example of the light guide element LG shown in FIG. 3.

As described above, the transparent layer 40 includes the plurality of band portions 41 and the frame portion 42 surrounding the plurality of band portions 41.

Each band portion 41 includes a first end portion 411 on the light emitting element LD side, a second end portion 412 on the opposite side of the first end portion 411, a first edge 413, and a second edge 414.

The first end portion 411 and the second end portion 412 are spaced apart from the frame portion 42. The first end portion 411 and the second end portion 412 have a first width W1 and a second width W2, respectively. Incidentally, the width in the present specification corresponds to a length along the first direction X. The second width W2 of the second end portion 412 is smaller than the first width W1 of the first end portion 411. For example, the first width W1 is smaller than a width WL of one light emitting element LD, and one light emitting element LD is disposed over the plurality of band portions 41 arranged in the first direction X. In addition, the first width W1 shown in FIG. 4 is equal to or smaller than a width WP of one pixel electrode PE (alternatively, a pitch of the pixel electrodes PE arranged in the first direction X). Incidentally, in the example illustrated, the first end portion 411 and the second end portion 412 are spaced apart from the frame portion 42, but at least one of the first end portion 411 and the second end portion 412 may be connected to the frame portion 42.

The band portion 41 includes a plurality of first band portions 41A, a plurality of second band portions 41B located closer to the second side surface SS2 side than the first band portion 41A, a plurality of third band portions 41C located closer to the third side surface SS3 side than the first band portion 41A, a plurality of fourth band portions 41D located closer to the second side surface SS2 side than the second band portion 41B, and a plurality of fifth band portions 41E located closer to the third side surface SS3 side than the third band portion 41C.

The second width W2 of the second end portion 412 of the second band portion 41B is smaller than the second width W2 of the second end portion 412 of the first band portion 41A. The second width W2 of the second end portion 412 of the third band portion 41C is smaller than the second width W2 of the second end portion 412 of the first band portion 41A. The second width W2 of the second end portion 412 of the fourth band portion 41D is smaller than the second width W2 of the second end portion 412 of the second band portion 41B. The second width W2 of the second end portion 412 of the fifth band portion 41E is smaller than the second width W2 of the second end portion 412 of the third band portion 41C. The first band portion 41A, the second band portion 41B, the third band portion 41C, the fourth band portion 41D, and the fifth band portion 41E have the same first width W1 of the first end portion 411.

One first band portion 41A is located at the center O of the width of the transparent substrate 30 in the first direction X. The second width W2 of the second end portion 412 of the second band portion 41B is equal to the second width W2 of the second end portion 412 of the third band portion 41C. The second width W2 of the second end portion 412 of the fourth band portion 41D is equal to the second width W2 of the second end portion 412 of the fifth band portion 41E. In addition, for example, the number of the second band portions 41B and the number of the third band portions 41C are equal to each other, and the number of the fourth band portions 41D and the number of the fifth band portions 41E are equal to each other. For example, the pattern of the band portion 41 is formed so as to have line symmetry with respect to the center O. In other words, the second band portion 41B and the third band portion 41C have the same shape, and the fourth band portion 41D and the fifth band portion 41E have the same shape. Incidentally, the number of each of the first band portions 41A, the second band portions 41B, the third band portions 41C, the fourth band portions 41D, and the fifth band portions 41E is not limited, and may be one or two or more.

The first edge 413 and the second edge 414 are connected to the first end portion 411 and the second end portion 412. The first edge 413 and the second edge 414 extend in a direction different from the first direction X and the second direction Y between the first end portion 411 and the second end portion 412. In addition, the first edges 413 of the first band portion 41A, the second band portion 41B, and the fourth band portion 41D extend in different directions from each other. The second edges 414 of the first band portion 41A, the third band portion 41C, and the fifth band portion 41E extend in different directions from each other. Here, both the first edge 413 and the second edge 414 extend linearly, but may be formed in a curved shape. The first width W1 and the second width W2 correspond to an interval between the first edge 413 and the second edge 414. The band portion 41 has a width that gradually decreases at a constant rate or at any rate from the first end portion 411 toward the second end portion 412.

The pixel electrode PE overlaps two adjacent band portions 41 in planar view. The pixel electrode PE also overlaps a gap GP between the adjacent band portions 41. As will be described later, a region overlapping the band portion 41 corresponds to a non-transmissive region where light from the light emitting element LD is hardly incident, and a region overlapping the gap GP corresponds to a transmissive region where light from the light emitting element LD can be incident.

The pixel electrode PE has a larger area overlapping the band portion 41 as it is located closer to the first side surface SS1 side, and has a smaller area overlapping the band portion 41 as it is located closer to the fourth side surface SS4 side. In other words, the pixel electrode PE has a smaller area overlapping the transmissive region as it is located closer to the first side surface SS1 side, and a larger area overlapping the transmissive region as it is located closer to the fourth side surface SS4 side.

In addition, the pixel electrode PE has a gradually decreasing area overlapping the band portion 41 as it is located closer to the second side surface SS2 side than the center O, and a gradually decreasing area overlapping the band portion 41 as it is located closer to the third side surface SS3 side than the center O. In other words, the pixel electrode PE has a gradually increasing area overlapping the transmissive region as it is located closer to the second side surface SS2 side than the center O, and a gradually increasing area overlapping the transmissive region as it is located closer to the third side surface SS3 side than the center O.

When the display panel PNL and the light guide element LG shown in FIG. 3 are overlapped, the plurality of band portions 41 is overlapped on the display portion DA in planar view, and the frame portion 42 is overlapped on the non-display portion NDA in planar view. The outer shape of the frame portion 42 is located inside the outer shape of the transparent substrate 30. In addition, the inside of the frame portion 42 corresponds to the display portion DA.

FIG. 5 is a schematic cross-sectional view of the display device DSP shown in FIG. 3 along the second direction Y. Incidentally, only the main part of the display panel PNL is shown. In addition, the layers such as the switching element SW, the insulating films 11 and 12, and the capacitive electrode 13 described above are generically called a constituent layer 50.

The configuration example shown in FIG. 5 corresponds to an example in which the transparent substrate 30 of the light guide element LG is bonded to the transparent substrate 20 of the second substrate SUB2 by a transparent adhesive layer AD. The transparent layer 40 including the band portion 41 is in contact with the main surface 30A. The transparent adhesive layer AD is in contact with substantially the entire surface of the main surface 20B, covers the transparent layer 40, and is in contact with the main surface 30A in a region where the transparent layer 40 is missing. The transparent layer 40 is located between the liquid crystal layer LC and the transparent substrate 30.

The refractive index of each of the transparent substrates 10 and 20 and the transparent adhesive layer AD is the same as the refractive index n1 of the transparent substrate 30 and higher than the refractive index n2 of the transparent layer 40. Incidentally, "same" here is not limited to a case where the refractive index difference is 0, and includes a case where the refractive index difference is 0.03 or less.

The transparent substrate 10 has a thickness T1, the transparent substrate 20 has a thickness T2, and the transparent substrate 30 has a thickness T3. Incidentally, the thickness in the present specification corresponds to a length along the third direction Z. In the example illustrated, the thickness T1 is equal to the thickness T2, and the thickness T3 is larger than the thicknesses T1 and T2. Incidentally, the thickness T3 may be equal to the thicknesses T1 and T2. For example, the thickness T3 is from 200 μm to 2000 μm. A thickness T4 of the transparent layer 40 is desirably 250 nm or more and 800 nm or less, and more desirably 400 nm or more and 550 nm or less. A thickness T5 of the transparent adhesive layer AD is from 4 μm to 4000 μm.

Next, emitted light from the light emitting element LD will be described.

The light emitting element LD emits light L1 toward the first side surface SS1. Since an air layer exists between the light emitting element LD and the first side surface SS1, the light L1 emitted from the light emitting element LD is refracted by the first side surface SS1 and is incident on the transparent substrate 30. Of the light L1 incident on the transparent substrate 30, light traveling from the transparent substrate 30 toward the transparent layer 40 is reflected at an interface between the transparent substrate 30 and the transparent layer 40. In addition, of the light L1 incident on the transparent substrate 30, light traveling toward the main surface 30B is reflected at an interface between the transparent substrate 30 and the air layer. As described above, the light L1 travels inside the transparent substrate 30 while being repeatedly reflected in the vicinity of the first side surface SS1 (alternatively, in a region where the transparent layer 40 exists).

Of the traveling light L1, light traveling toward a region where the transparent layer 40 does not exist, that is, a region where the transparent substrate 30 and the transparent adhesive layer AD are in contact with each other passes through the transparent substrate 30 and then passes through the transparent substrate 20 via the transparent adhesive layer AD. In other words, while the incidence of the light L1 from the light emitting element LD on the display panel PNL is suppressed in the region close to the light emitting element LD, the incidence of the light L1 on the display panel PNL is promoted in the region spaced apart from the light emitting element LD. Incidentally, in the region close to the light emitting element LD, the light L1 is not incident on the display panel PNL at all, but as shown in FIG. 4, the light L1 is incident on the display panel PNL from the gap GP between the adjacent band portions 41.

The light L1 incident on the display panel PNL is transmitted through the pixels in a transparent state and scattered by the pixels in a scattered state. The display device DSP can be observed from the main surface 30B side and can also be observed from the main surface 30A side. In addition, the display device DSP is a so-called transparent display, and even when it is observed from the main surface 30B side or the main surface 30A side, the background of the display device DSP can be observed through the display device DSP.

Next, effects that can be obtained by the present embodiment will be described with reference to FIGS. 4 and 5.

The light L1 emitted from the light emitting element LD is absorbed and scattered by a member constituting the display device DSP, and the amount of light decreases as the light L1 is spaced apart from the light emitting element LD. For this reason, the luminance of the display surface may decrease as the light L1 is spaced apart from the light emitting element LD. In addition, since the amount of light reaching from the light emitting element LD decreases as it is closer to the second side surface SS2 and the third side surface SS3 of the display surface, a luminance difference may occur between the center and the left and right of the display surface. That is, light also reaches the center O from the left and right light emitting elements LD, but since the light emitting elements LD do not exist on the left side of the second side surface SS2 and the right side of the third side surface SS3, the amount of light reaching the side surfaces is smaller than that at the center O. In particular, as the width of the light emitting element LD in the first direction X increases with an increase in size of the display panel PNL, a luminance difference in the first direction X is likely to occur.

According to the present embodiment, in the region where the transparent layer 40 exists, the light L1 incident from the first side surface SS1 is guided while being totally reflected inside the transparent substrate 30, so that the incidence of the light L1 on the display panel PNL is suppressed. In contrast, in the region where the transparent layer 40 does not exist, the incidence of the light L1 on the display panel PNL is promoted. As shown in FIG. 4, the pixel electrode PE has a larger area overlapping the band portion 41 as it is located closer to the first side surface SS1 side, and has a smaller area overlapping the band portion 41 as it is located closer to the fourth side surface SS4 side. In other words, in the display portion DA, an overlap area between each of the pixel electrodes PE arranged in the second direction Y and the transparent layer 40 is optimized in accordance with the decrease in the luminance of the light L1 along the second direction Y. Therefore, in the second direction Y, the amount of illumination light per pixel electrode PE can be uniformized.

In addition, according to the present embodiment, the pixel electrode PE has a gradually decreasing area overlapping the band portion 41 as it is located closer to the second side surface SS2 side than the center O, and a gradually decreasing area overlapping the band portion 41 as it is located closer to the third side surface SS3 side than the center O. In other words, in the display portion DA, an overlap area between each of the pixel electrodes PE arranged in the first direction X and the transparent layer 40 is optimized in accordance with the decrease in the luminance of the light L1 along the first direction X. Therefore, in the first direction X, the amount of illumination light per pixel electrode PE can be uniformized.

As described above, the in-plane luminance of the display portion DA along the first direction X and the second direction Y can be uniformized. As a result, degradation in display quality due to non-uniformity of the illumination light can be suppressed.

Incidentally, in the example shown in FIG. 5, the main surface 30B of the transparent substrate 30 is in contact with air, but another transparent layer having the same refractive index as the transparent layer 40 may be disposed on the entire surface of the main surface 30B. Although the main surface 10A of the transparent substrate 10 is in contact with air, another transparent substrate similar to the transparent substrate 30 may be bonded to the main surface 10A.

Figure 6:
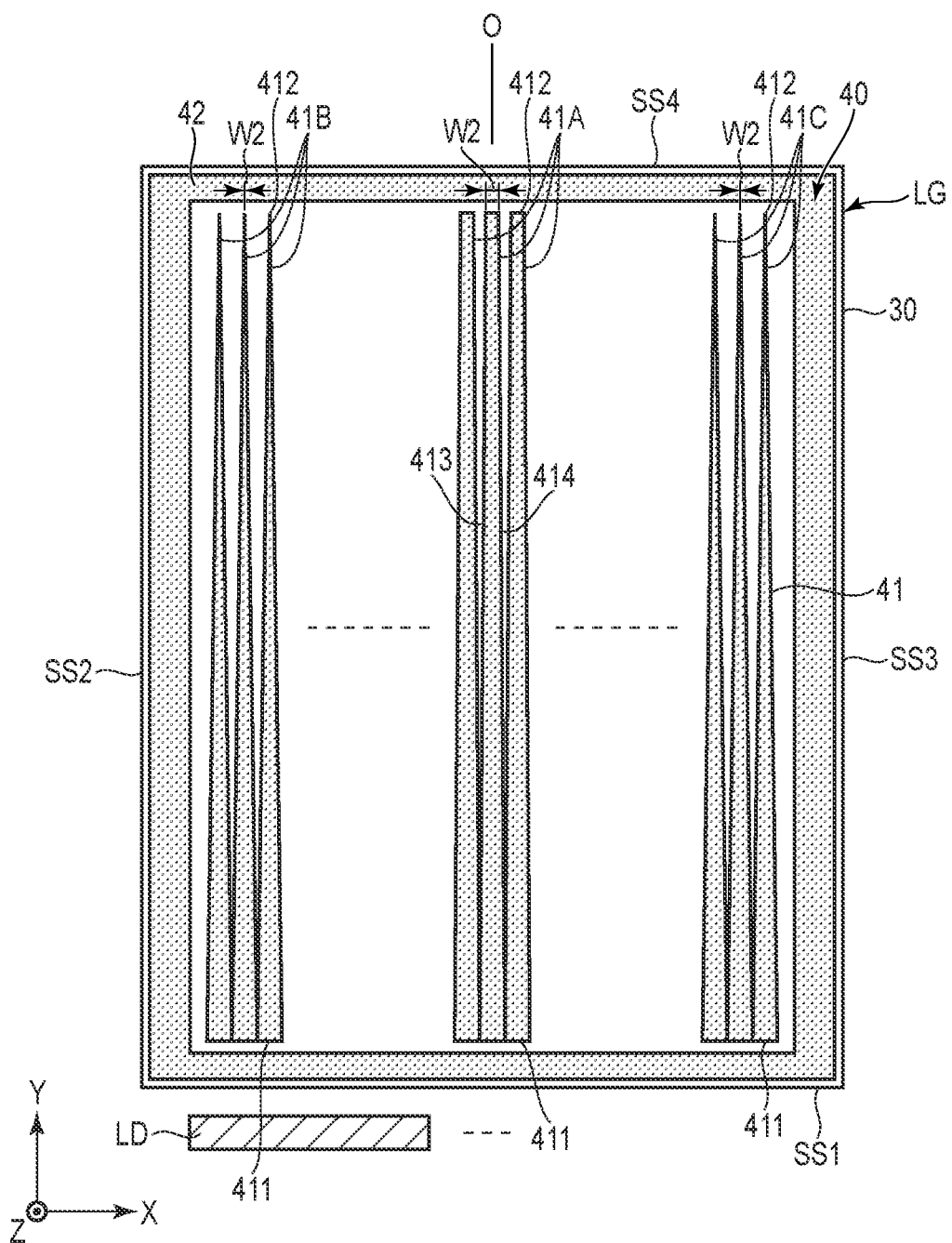
FIG. 6 is a plan view showing another configuration example of the light guide element shown in FIG. 4.

FIG. 6 is a plan view showing another configuration example of the light guide element LG shown in FIG. 4. The configuration example shown in FIG. 6 is different from the configuration example shown in FIG. 4 in that the fourth band portions 41D and the fifth band portions 41E are not formed.

That is, in the band portion 41 shown in FIG. 4, the second width W2 of the second end portion 412 varies in three steps from the center O to the second side surface SS2, whereas in the band portion 41 shown in FIG. 6, the second width W2 of the second end portion 412 varies in two steps from the center O to the second side surface SS2. Similarly, in the band portion 41 shown in FIG. 4, the second width W2 of the second end portion 412 varies in three steps from the center O to the third side surface SS3, whereas in the band portion 41 shown in FIG. 6, the second width W2 of the second end portion 412 varies in two steps from the center O to the third side surface SS3.

Also in this configuration example, the same effects as those described above can be obtained.

Figure 7:
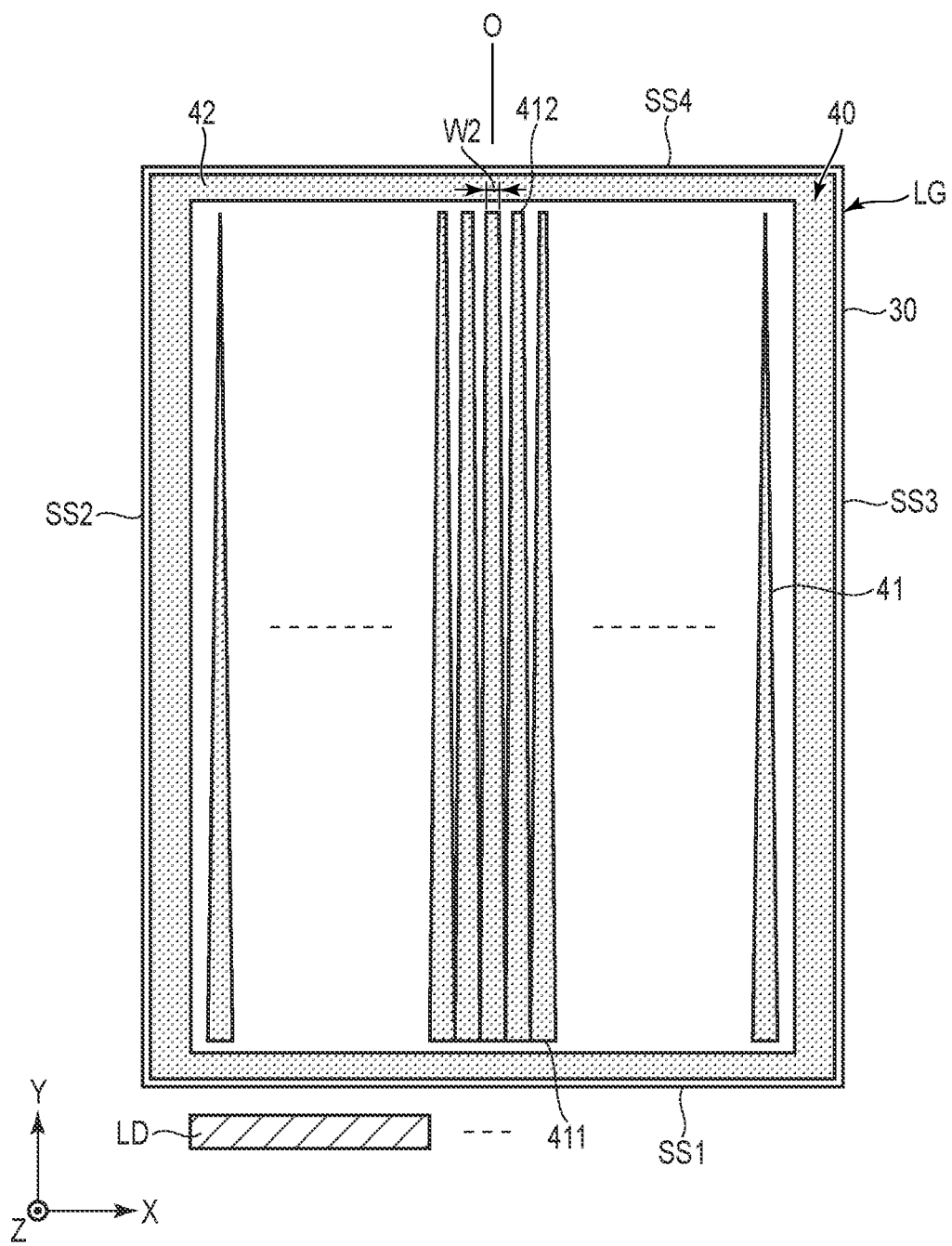
FIG. 7 is a plan view showing another configuration example of the light guide element shown in FIG. 4.

FIG. 7 is a plan view showing another configuration example of the light guide element LG shown in FIG. 4. The configuration example shown in FIG. 7 is different from the configuration example illustrated in FIG. 4 in terms of the second width W2 of the second end portion 412.

As the plurality of band portions 41 is located closer to the second side surface SS2 side than the center O, the second width W2 of the second end portion 412 decreases, and as the plurality of band portions 41 is located closer to the third side surface SS3 side than the center O, the second width W2 of the second end portion 412 decreases.

Also in this configuration example, the same effects as those described above can be obtained.

Figure 8:
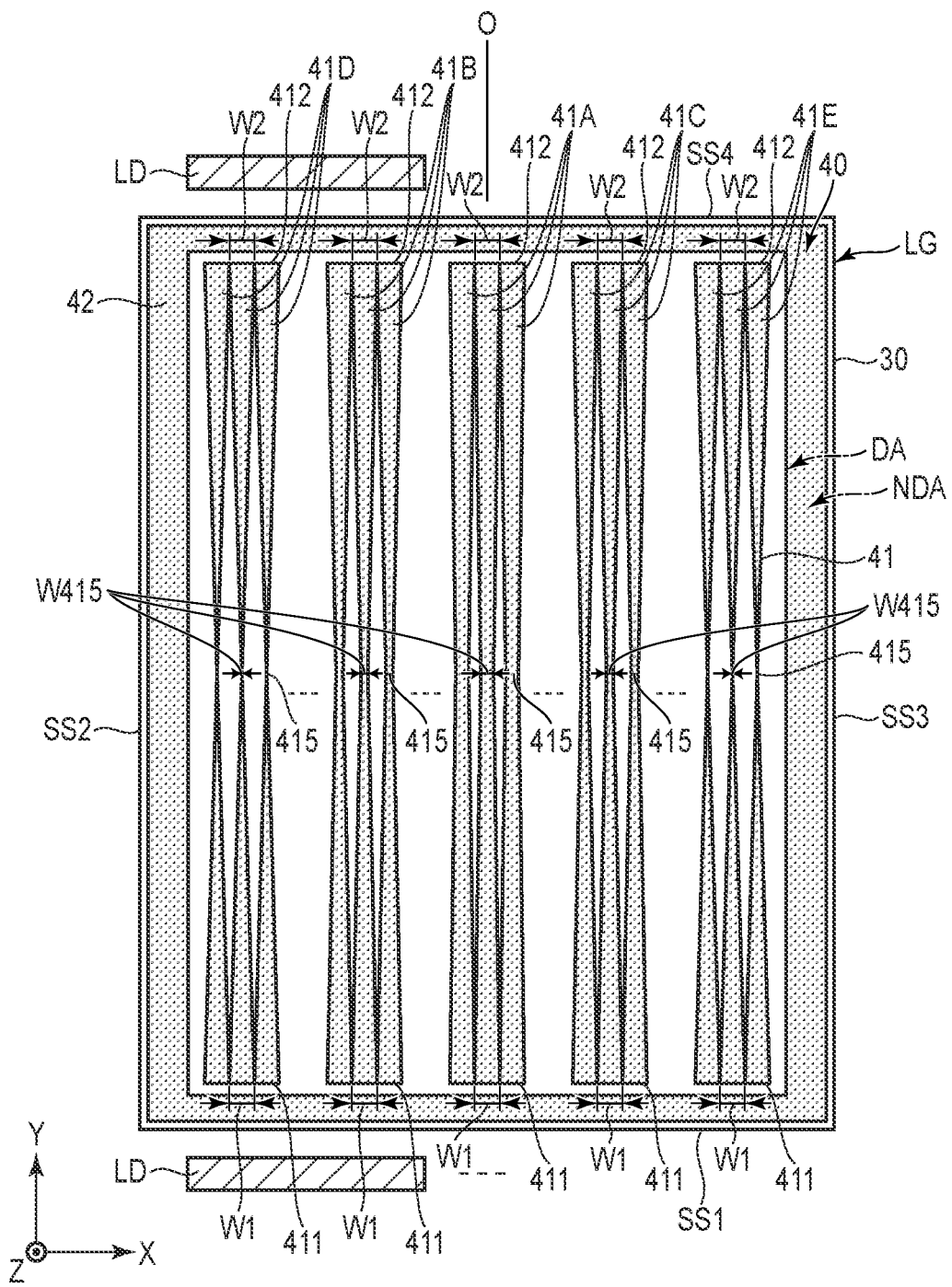
FIG. 8 is a plan view showing another configuration example of the light guide element shown in FIG. 4.

FIG. 8 is a plan view showing another configuration example of the light guide element LG shown in FIG. 4. The configuration example shown in FIG. 8 is different from the configuration example shown in FIG. 4 in that the width of the band portion 41 is reduced at an intermediate portion 415 between the first end portion 411 and the second end portion 412.

The first width W1 of the first end portion 411 is larger than a width W415 of the intermediate portion 415, and the second width W2 of the second end portion 412 is larger than the width W415 of the intermediate portion 415. The width of the band portion 41 decreases from the first end portion 411 to the intermediate portion 415. In addition, the width of the band portion 41 decreases from the second end portion 412 to the intermediate portion 415. For example, for one band portion 41, the first width W1 and the second width W2 are equal to each other.

The width W415 of the intermediate portion 415 of the second band portion 41B is smaller than the width W415 of the intermediate portion 415 of the first band portion 41A. The width W415 of the intermediate portion 415 of the third band portion 41C is smaller than the width W415 of the intermediate portion 415 of the first band portion 41A. The width W415 of the intermediate portion 415 of the fourth band portion 41D is smaller than the width W415 of the intermediate portion 415 of the second band portion 41B. The width W415 of the intermediate portion 415 of the fifth band portion 41E is smaller than the width W415 of the intermediate portion 415 of the third band portion 41C. For example, the first band portion 41A, the second band portion 41B, the third band portion 41C, the fourth band portion 41D, and the fifth band portion 41E have the same first width W1 of the first end portion 411. For example, the first band portion 41A, the second band portion 41B, the third band portion 41C, the fourth band portion 41D, and the fifth band portion 41E have the same second width W2 of the second end portion 412.

One first band portion 41A is located at the center O. The width W415 of the intermediate portion 415 of the second band portion 41B is equal to the width W415 of the intermediate portion 415 of the third band portion 41C. The width W415 of the intermediate portion 415 of the fourth band portion 41D is equal to the width W415 of the intermediate portion 415 of the fifth band portion 41E. In addition, for example, the number of the second band portions 41B and the number of the third band portions 41C are equal to each other, and the number of the fourth band portions 41D and the number of the fifth band portions 41E are equal to each other. For example, the pattern of the band portion 41 is formed so as to have line symmetry with respect to the center O. In other words, the second band portion 41B and the third band portion 41C have the same shape, and the fourth band portion 41D and the fifth band portion 41E have the same shape.

The light emitting element LD is also disposed at a position opposed to the fourth side surface SS4. By reducing the width of the band portion 41 at the intermediate portion 415, more light can reach the center of the display panel when light is incident from both side surfaces of the light guide element LG. Therefore, the in-plane luminance of the display portion DA along the second direction Y can be uniformized. In addition, the band portion 41 has a gradually decreasing area per unit region as it is located closer to the second side surface SS2 side than the center O, and a gradually decreasing area per unit region as it is located closer to the third side surface SS3 side than the center O. Therefore, as shown in FIG. 4, the in-plane luminance of the display portion DA along the first direction X can be uniformized.

Also in this configuration example, the same effects as those described above can be obtained.

Figure 9:
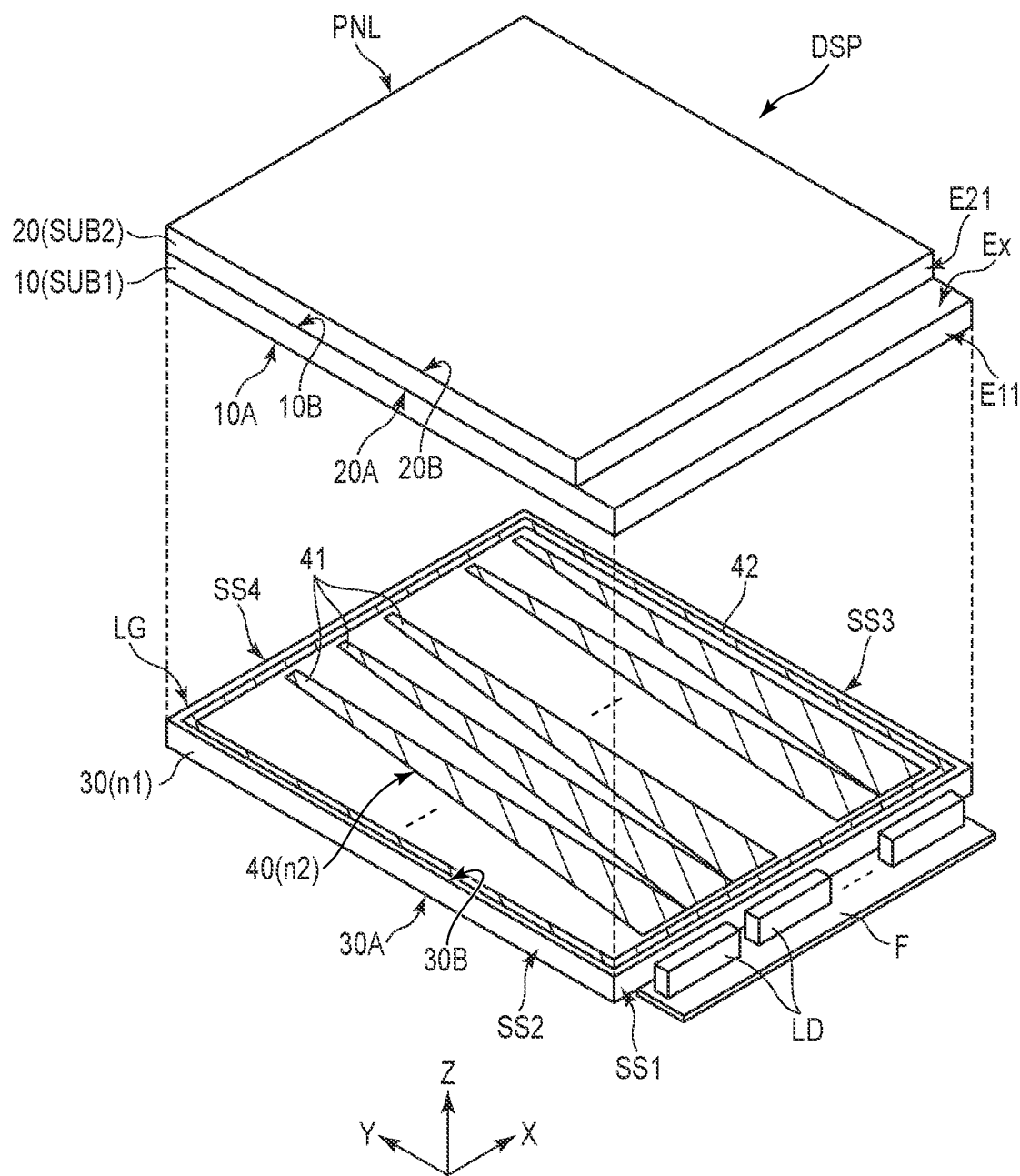
FIG. 9 is an exploded perspective view showing another configuration example of the display device shown in FIG. 3.

FIG. 9 is an exploded perspective view showing another configuration example of the display device DSP shown in FIG. 3. The configuration example shown in FIG. 9 is different from the configuration example shown in FIG. 3 in that the light guide element LG is located below the display panel PNL.

The light guide element LG, the first substrate SUB1, and the second substrate SUB2 are arranged in this order along the third direction Z.

The main surface 30B of the transparent substrate 30 is opposed to the main surface 10A of the transparent substrate 10. The transparent substrate 30 is bonded to the transparent substrate 10 with the transparent layer 40 interposed therebetween as described later. In the example shown in FIG. 9, the first side surface SS1 is located directly under the edge portion E11 of the first substrate SUB1. However, the first side surface SS1 may be located directly under the extended portion Ex, or may be located further outside the edge portion E11.

The transparent layer 40 is disposed on the main surface 30B. As in FIG. 3, the transparent layer 40 includes the plurality of band portions 41 arranged spaced apart in the first direction X. Each of the band portions 41 extends along the second direction Y. The main surface 30B is exposed between the adjacent band portions 41. In addition, the transparent layer 40 includes a frame portion 42 surrounding the plurality of band portions 41.

Incidentally, in the example shown in FIG. 9, the main surface 30A of the transparent substrate 30 is in contact with air, but another transparent layer having the same refractive index as the transparent layer 40 may be disposed on the entire surface of the main surface 30A. In addition, although the main surface 20B of the transparent substrate 20 is in contact with air, another transparent substrate similar to the transparent substrate 30 may be bonded to the main surface 20B.

Figure 10:
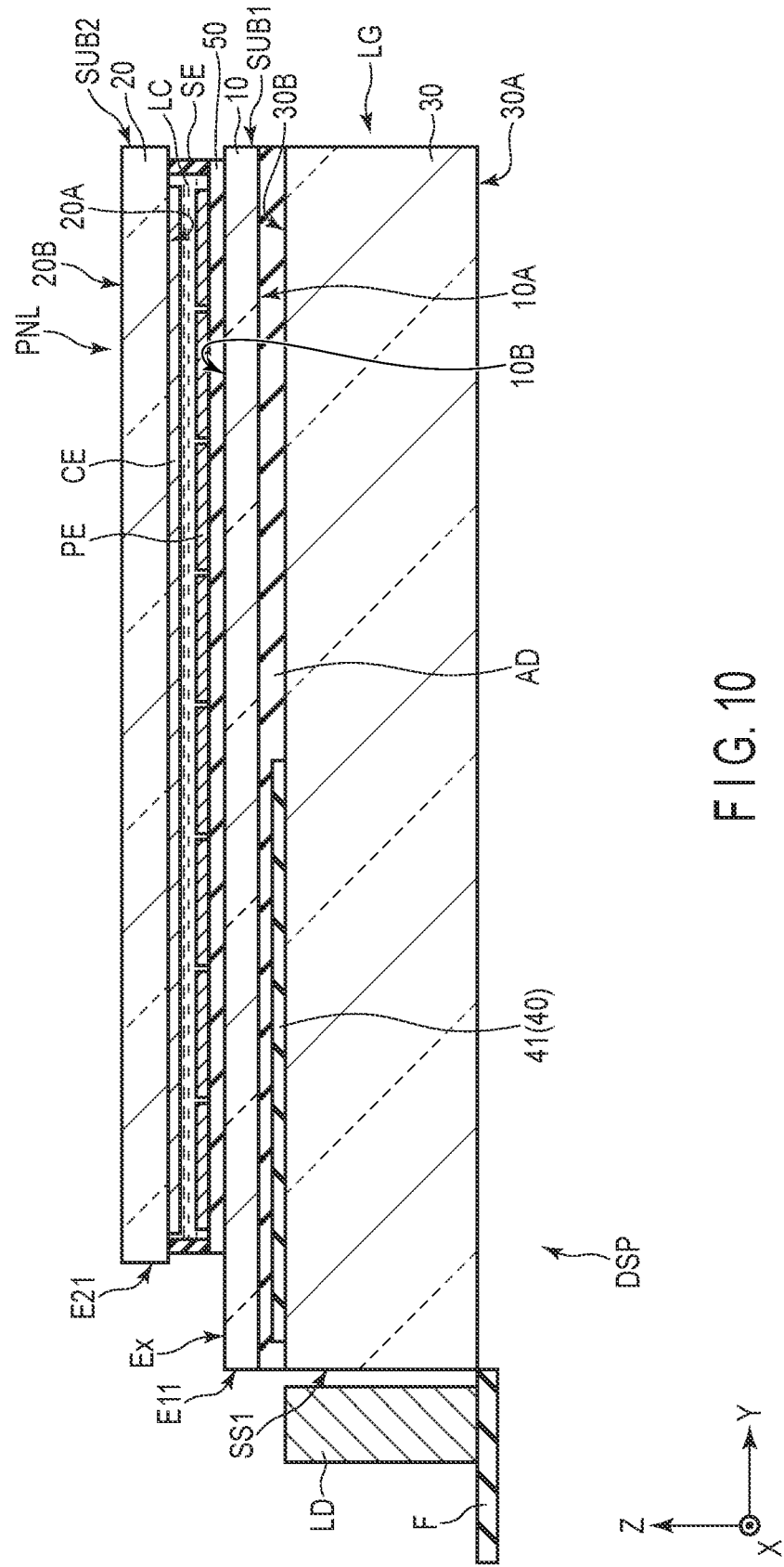
FIG. 10 is a schematic cross-sectional view of the display device shown in FIG. 9 along the second direction.

FIG. 10 is a schematic cross-sectional view of the display device DSP shown in FIG. 9 along the second direction Y. Incidentally, only the main part of the display panel PNL is shown.

The configuration example shown in FIG. 10 corresponds to an example in which the transparent substrate 30 of the light guide element LG is bonded to the transparent substrate 10 of the first substrate SUB1 by a transparent adhesive layer AD. The transparent layer 40 including the band portion 41 is in contact with the main surface 30B. The transparent adhesive layer AD is in contact with substantially the entire surface of the main surface 10A, covers the transparent layer 40, and is in contact with the main surface 30B in the region where the transparent layer 40 is missing. The configuration of the display panel PNL is as described above.

Also in this configuration example, the same effects as those described above can be obtained.

As described above, according to the present embodiment, it is possible to provide a display device capable of suppressing degradation in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a substrate including a main surface, a first side surface, a second side surface intersecting the first side surface, and a third side surface intersecting the first side surface and located on an opposite side of the second side surface;
    light emitting elements opposing the first side surface;
    a liquid crystal layer which light emitted from the light emitting elements enters; and
    a transparent layer being in contact with the main surface, located between the main surface and the liquid crystal layer, and having a refractive index lower than a refractive index of the substrate, wherein
    the transparent layer has band portions arranged along the first side surface and a frame portion surrounding the band portions,
    each of the band portions has a first end on a side of the first side surface and a second end opposite to the first end,
    the band portions include a first band portion, and a second band portion located between the first band portion and the second side surface,
    the second band portion is closer to the second side surface than to the third side surface,
    the second end of the first band portion has a first width,
    the second end of the second band portion has a second width, and
    the first width is wider than the second width.
2. The display device according to claim 1, wherein the liquid crystal layer includes a polymer dispersed liquid crystal.
3. The display device according to claim 1, wherein an image displayed by the display device can be observed in both the main surface side and an opposite side of the main surface.
4. The display device according to claim 1, wherein a background of the display device can be observed through the display device.
5. The display device according to claim 1, wherein the transparent layer is made of a siloxane-based resin or a fluorine-based resin.
6. The display device according to claim 1, wherein the substrate is a third substrate,
    the display device further comprising:
    a first substrate including pixel electrodes; and
    a second substrate, wherein
    the liquid crystal layer is held between the first substrate and the second substrate, and
    the third substrate is on one of the first substrate and the second substrate.
7. The display device according to claim 1, wherein the first end is wider than the second end.
8. The display device according to claim 1, wherein the first band portion is opposed to a center of the first side surface.
9. The display device according to claim 1, wherein the first band portion is located between the second side surface and a center of the main surface.
10. The display device according to claim 1, wherein the band portions overlap a display portion displaying an image, and the frame portion overlaps a non-display portion surrounding the display portion.
11. The display device according to claim 1, wherein the band portions are separated from the frame portion.
12. The display device according to claim 1, wherein the second end is separated from the frame portion.
13. The display device according to claim 12, wherein the first end is in contact with the frame portion.
14. The display device according to claim 1, further comprising:

a third band portion, wherein
the second end of the third band portion has a third width,
the first band portion is located between the second band portion and the third band portion, and
the first width is wider than the third width.

15. The display device according to claim 1, further comprising:
a fourth band portion, wherein
the second end of the fourth band portion has a fourth width,
the second band portion is located between the first band portion and the fourth band portion, and
the second width is wider than the fourth width.

16. A display device comprising:
a substrate including a main surface, a first side surface, a second side surface intersecting the first side surface, and a third side surface intersecting the first side surface and located on an opposite side of the second side surface;
light emitting elements opposing the first side surface;
a liquid crystal layer which light emitted from the light emitting elements enters; and
a transparent layer being in contact with the main surface, located between the main surface and the liquid crystal layer, and having a refractive index lower than a refractive index of the substrate, wherein
the transparent layer has band portions arranged along the first side surface,
each of the band portions has a first end on a side of the first side surface and a second end opposite to the first end,
the band portions include a first band portion, and a second band portion located between the first band portion and the second side surface,
the second band portion is closer to the second side surface than to the third side surface,
the second end of the first band portion has a first width,
the second end of the second band portion has a second width, and
the first width is wider than the second width.

17. The display device according to claim 16, wherein
the first band portion is closer to a center of the main surface than to the second side surface.

18. A display device comprising:
a substrate including a main surface, a first side surface, and a second side surface intersecting the first side surface;
light emitting elements opposing the first side surface;
a liquid crystal layer which light emitted from the light emitting elements enters; and
a transparent layer on the main surface, located between the main surface and the liquid crystal layer, and having a refractive index lower than a refractive index of the substrate, wherein
the transparent layer has band portions arranged along the first side surface and a frame portion surrounding the band portions,
each of the band portions has a first end on a side of the first side surface and a second end opposite to the first end, and
the second end is separated from the frame portion.

19. The display device according to claim 18, wherein
an entirety of each of the band portions is separated from the frame portion.

20. The display device according to claim 18, wherein
the first end is in contact with the frame portion.

\* \* \* \* \*